(12) United States Patent
Scott et al.

(10) Patent No.: US 12,190,220 B1
(45) Date of Patent: Jan. 7, 2025

(54) SELF-LEARNING FORM PREPARATION ENGINE

(71) Applicant: HRB Innovations, Inc., Las Vegas, NV (US)

(72) Inventors: Laurie Croslin Scott, Kansas City, MO (US); David Longstreet, Blue Springs, MO (US); Balamurugan Mohan, Kansas City, MO (US)

(73) Assignee: HRB Innovations, Inc., Wilmington, DE (US)

( * ) Notice: Subject to any disclaimer, the term of this patent is extended or adjusted under 35 U.S.C. 154(b) by 1053 days.

(21) Appl. No.: 15/207,752

(22) Filed: Jul. 12, 2016

(51) Int. Cl.
*G06N 3/006* (2023.01)
*G06N 20/00* (2019.01)
*G06Q 40/12* (2023.01)
*G06Q 50/18* (2012.01)

(52) U.S. Cl.
CPC ............. *G06N 3/006* (2013.01); *G06N 20/00* (2019.01); *G06Q 40/123* (2013.12); *G06Q 50/18* (2013.01)

(58) Field of Classification Search
CPC .... G06Q 40/123; G06Q 50/18; G06Q 20/207; G06F 17/243; G06N 20/00
See application file for complete search history.

(56) References Cited

U.S. PATENT DOCUMENTS

| | | | |
|---|---|---|---|
| 7,685,034 B1* | 3/2010 | Mori ...................... | G06Q 40/02 705/36 R |
| 9,892,106 B1* | 2/2018 | Lesner et al. ......... | G06F 17/243 |
| 2003/0110443 A1* | 6/2003 | Yankovich ............. | G06Q 10/10 715/205 |
| 2011/0213697 A1* | 9/2011 | Dodini ............... | G06Q 10/1057 705/38 |
| 2012/0137238 A1* | 5/2012 | Abeln ................. | G06F 3/04847 715/771 |
| 2017/0004584 A1* | 1/2017 | Wang et al. .......... | G06Q 40/00 |

OTHER PUBLICATIONS

Carley et al., "Predicting Intentional and Inadvertent Noncompliance," Selected Papers Given at the 2010 IRS Research Conference, Washington, D.C., Jun. 29-30, 2010 (Year: 2010).*
A10s et al., "In a user interface, is it better to "gray out" or hide features that are unavailable? [closed]" Oct. 28, 2009, stackoverflow.com, accessed Jan. 28, 2023 at <https://stackoverflow.com/questions/1608379/in-a-user-interface-is-it-better-to-gray-out-or-hide-features-that-are-unavai> (Year: 2009).*

* cited by examiner

*Primary Examiner* — James D. Rutten
(74) *Attorney, Agent, or Firm* — Erise IP, P.A.

(57) ABSTRACT

System, method, and media for the preparation of complex forms and more particularly for exploiting differential error rates in different groups of such forms to reduce the error rates when completing such forms. In particular, embodiments of the invention determine trends between data items in each of two data sets and determine how these trends differ between the two data sets. Based on these trend differences, rules can be generated to alter the operation of a form preparation engine to guide users towards more correct form entries. Forms completed in this way are more likely to be complete and, as such, can be added to the data sets to close the loop and further improve later form completions.

20 Claims, 3 Drawing Sheets

SELF-LEARNING FORM PREPARATION ENGINE

BACKGROUND

1. Field

Embodiments of the invention generally relate to systems for the preparation of complex forms and more particularly to exploiting differential error rates in different groups of such forms to reduce the error rates when completing them.

2. Related Art

Traditionally, complex forms (such as, for example, income tax returns) have been difficult for individuals to complete both correctly and in such a way as to maximize their benefit from the form. As such, individuals may instead choose to pay a professional to complete such forms on their behalf. Thus, form preparation services may have large databases of both self-prepared forms and professionally prepared forms. The greater expertise of professional preparers means that these two data sets will differ in significant ways. Because professionally prepared forms are more likely to be correct than self-prepared forms, there is a need for a self-learning preparation engine that can analyze self-prepared forms and professionally prepared forms to determine differences between the two data sets and provide self-preparers with guidance to increase form correctness.

SUMMARY

Embodiments if the invention address this need by providing a self-learning form completion system that can automatically guide self-prepared forms to be closer to professionally prepared forms. In particular, in a first embodiment, the invention includes a method of modifying the operation of a form completion engine, comprising the steps of ingesting a first set of forms, ingesting a second set of forms, analyzing the first set of forms to determine a first trend set, analyzing the second set of forms to determine a second trend set, comparing the first trend set and the second trend set to determine a trend difference, based on the trend difference, generating a rule; and modifying the form completion engine using the rule.

In a second embodiment, the invention includes a self-learning system for completing forms, comprising a first data store storing a first set of forms, a second data store storing a second set of forms, a statistical analyzer programmed to analyze a set of forms and generate a trend set corresponding to the set of forms, a comparator programmed to analyze a first trend set and a second trend set and determine a trend difference, a rules generation engine programmed to generate a rule based on a trend difference; and a form completion engine programmed to allow a user to complete a form, wherein the behavior of the form completion engine is modified by the rule to guide the user so as to reduce errors when completing the form.

In a third embodiment, the invention includes one or more computer readable media storing computer-executable instructions that, when executed by a processor, perform a method of self-learning tax return completion, comprising the steps of ingesting a first set of tax returns from a data store, ingesting a second set of tax returns from the data store, determining a first trend set for the first set of tax returns, determining a second trend set for the second set of tax returns, comparing the first trend set and the second trend set to determine a trend difference, modifying a tax return preparation engine based on the trend difference.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
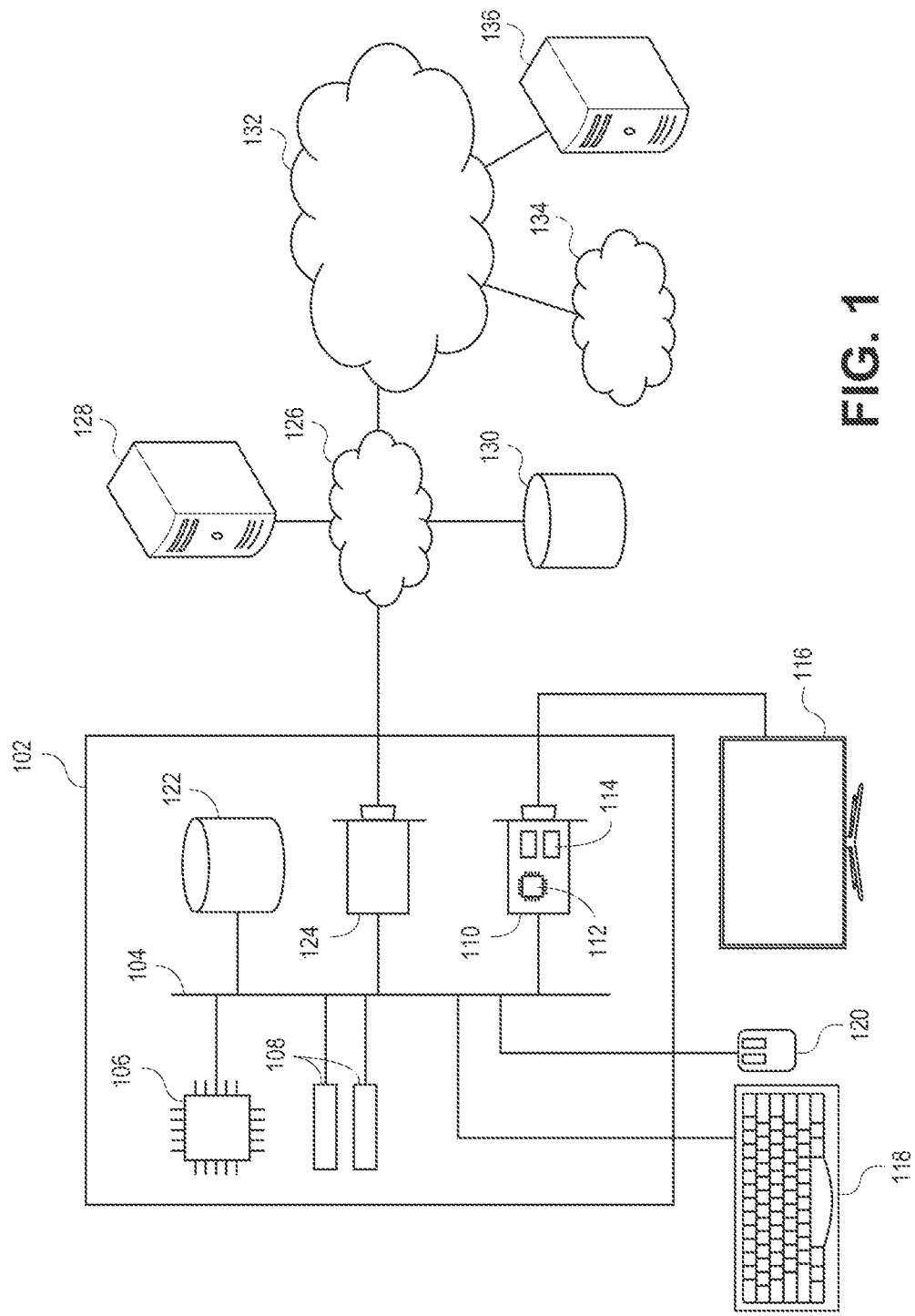
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention utilize differences in different classes of forms to identify and prevent common mistakes. For example, differences between self-prepared tax returns and professionally prepared returns can be leveraged to determine common mistakes in self-prepared returns. The operation of the engine for completing the forms (e.g., the tax returns) can then be modified to direct users (for example, via double-check prompts) to prevent these common errors.

In particular, embodiments of the invention determine trends (such as correlations between form entries) in each data set and then determine how those trends vary between the data sets. Thus, for example, if a first factor is correlated with a second factor in professionally prepared returns but not in self-prepared returns, then self-preparers might be prompted to enter the second factor if they include the first factor. In this way a common error (here, omitting the second factor if the first factor is present) can be avoided.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
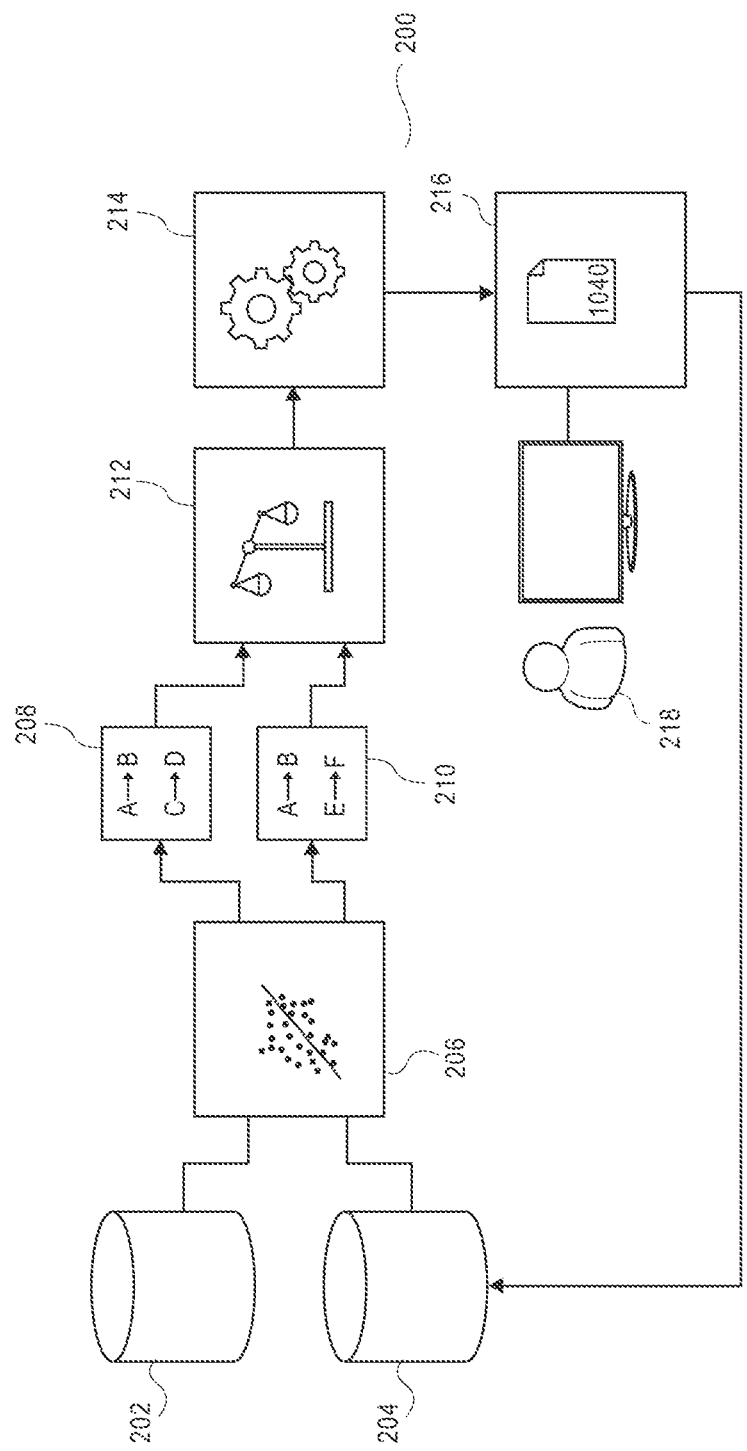
FIG. 2 depicts a system in accordance with embodiments of the invention.

Turning now to FIG. 2, a system in accordance with embodiments of the invention is depicted and referred to generally by reference numeral 200. System 200 includes a first data store 202 and a second data store 204 storing a first set of forms and a second set of forms, respectively. For the sake of clarity and brevity, this specification will discuss these forms as being tax returns; however, one of skill in the art will appreciate that the principles and techniques discussed herein can be applied in a variety of applications and for a variety of types of forms. In some embodiments, the first data store and the second data store are only conceptual, and a single physical data store stores all forms, appropriately tagged such that they can be sorted into the appropriate set of forms. In some embodiments, one or more additional data stores may further be present for n-way analyses.

Data stores 202 and 204 store, for each tax return, tax data items for that tax return. Other data (such as information about the submission of the tax data) may also be stored and used as described below. Broadly speaking, tax data items are those items of information used in completing a tax return. Tax data may be provided by user, imported from a prior tax return for the user, or imported from an external source (e.g., a bank or a payroll provider) based on data provided by the user. Tax data may also include values derived from other tax data. For example, the taxpayer's Adjusted Gross Income (AGI) is a tax data item. The taxpayer's AGI is not entered directly by the user, but calculated as the taxpayer's gross income minus the above-the-line deduction. The taxpayer's gross income and above-the-line deduction are themselves calculated values based on other calculated values and values directly provided (or imported) by the user.

Broadly speaking, the first set of tax returns stored in the first data store and the second set of tax returns stored in the second data store differ in some key respect that results in a different error rate between the first set of tax returns and the second set of tax returns. In some embodiments, a tax return containing an error is one that does not comply with the federal tax code and, as such, might subject the taxpayer to financial or legal penalties. In other embodiments, an erroneous return might be one that, while technically compliant with the tax code, subjects the taxpayer to more tax liability than necessary. As such, errors in a return may be measured by an ex post facto audit rate, the impact on net tax liability, or by comparison against another, more correct data set. Other methods for detecting errors or determining which data set is more correct are also contemplated and are discussed in greater detail below.

As an example of the above, the first set of tax returns might be self-prepared, while the second set of tax returns might be prepared by a tax professional. In such a scenario, the professionally prepared returns might have a lower error rate than the self-prepared returns. In some embodiments, the first set of tax returns might be more erroneous in one respect, but less erroneous in another respect. Thus, the professionally prepared returns might be prepared more conservatively, such that they contain fewer violations of the tax code, but take advantage of fewer tax-reduction strategies that, while allowed by the tax code, are perceived by tax professionals as risky. Alternatively, the first set of tax returns might be returns that have been amended subsequent to submission, while the second set of returns has not been amended. As yet another alternative, the first set of returns might have been audited, while the second set of returns has not been audited.

Tax returns from first data store 202 and second data store 204 are analyzed by statistical analyzer 206. In some embodiments, tax returns from first data store 202 and second data store 204 are analyzed independently; in other embodiments, the two sets of tax returns are analyzed jointly by statistical analyzer 206. Broadly speaking, statistical analyzer 206 determines correlations and commonalities between tax data items within each data set. For example, it may be the case in one data set that taxpayers who report rental income are highly likely to take an itemized deduction for mortgage interest. As used herein, a "trend" within a data set is any predictive association between two or more tax data items in the data set. Alternatively, statistical analyzer 206 may determine absolute or conditional take rates for certain deductions within each data set. For example, the mortgage interest deduction might be taken in 25% of the tax returns in a data set. Such single-item trends are also contemplated as being with the scope of the invention.

Statistical analyzer 206 may use any statistical techniques, now known or later developed, to identify a first set of trends 208 within the first set of tax returns stored in the first data store and a second set of trends 210 within the second set of tax returns stored in the second data store. For example, pairwise correlations may be calculated across all tax data items in a set of tax returns. In some embodiments, multiple regressions may also be used to identify correlated triples or n-tuples. In other embodiments, neural-network based techniques such as Restricted Boltzman Machines can be used to identify trends within the sets of tax returns. In still other embodiments, matrix-based techniques such as SVD++ can be used to identify trends. One of skill in the art will appreciate that there are a variety of other statistical and machine-learning techniques that can be used to determine sets of trends 208 and 210. However, it is significant to note that a set of trends within a data set cannot be used to identify errors within that data set, because the errors are baked into the data set. As such, machine learning techniques will identify these errors as being normal. Thus, it is an advantage of embodiments of the invention that they can identify errors that cannot be identified based on the analysis of a single data set.

Trend set 208 and trend set 210 are passed to comparator 212, which determines how the trends in the first data set differ from the trends in the second data set. For example, a marital filing status of "married filing jointly" may be highly correlated with taking a dependent across all tax returns in both set of tax returns. These trends represent things that all taxpayers are already doing right, and thus may be disregarded. However, where there are trends in one set of tax returns that are not present in the other set of tax returns (or, where there are more than two sets of tax returns, the other sets of tax returns), the discrepancy indicates the presence of a common error in one data set or the other. Thus, if a first tax data item is correlated with a second tax data item in professionally prepared returns, but not in self-prepared returns, then it is likely that self-preparers should be including the second tax data item if they include the first. So if, for example, professionally prepared tax returns claiming the state income tax deduction also report income from state income tax refunds but self-prepared tax returns claiming the state income tax deduction do not, then omitting this income is likely a common error made by self-preparers.

It is the task of comparator 212 to identify such trend differences between the first set of tax returns and the second set of tax returns. The precise method of operation of comparator 212 may depend on the statistical techniques employed by statistical analyzer 206. For example, if trend sets 208 and 210 are simply pairs of tax data items that have been determined to be correlated, then comparator 212 can simply remove any pairs that appear in both trend set 208 and trend set 210 and the remaining trends in both trend sets make up the trend differences. On the other hand, if statistical analyzer computes individual correlations for each pair of tax data items, then the trend differences may instead be calculated by subtracting the pairwise correlations and then thresholding appropriately. As discussed above, in some embodiments, statistical analyzer 206 and comparator 212 are integrated into a single functional unit that computes trend differences directly.

Trend differences are processed by rules generation engine 214 to generate one or more rules for changing the operation of tax preparation engine 216. Continuing the example above, rules generation engine 214 might generate a rule specifying that if a taxpayer claims the state income tax deduction but does not report income from state income tax refunds, then the tax preparer should be prompted to confirm that the taxpayer did not receive state tax refund income. Other types of rules are also possible. For example, tax law changes from year to year, and tax professionals are much more likely to track these changes than are self-preparers. As such, comparator 212 may identify one or more trend differences associated with the changed tax laws, which could result in tax tips being added to return preparation engine 216 to explain the changes to tax preparer 218.

Rules generated by rule generation engine 214 may override the conventional processing of tax return preparation engine in a variety of ways. For example, where the conventional processing for a text entry field might unconditionally accept a preparer's input, a rule might override that conventional processing to provide a warning if the entry detects that a common error is associated with that text entry field. Alternatively, in an interface where common fields are presented by default and obscure fields are hidden, rules might display an obscure field or hide a common field to reduce the incidence of error. Rules may also override the conventional processing of the interface itself by, for example, automatically reflowing a tax form or tax interview interface of tax return preparation engine 216 to add double-check prompts inline during the course of the interview where a tax preparer's entries indicate that a common error has occurred or is likely to occur.

Tax return preparation engine 216 interacts with tax preparer 218 to receive tax data items for a taxpayer and use those tax data items to complete one or more tax forms 220. Tax preparation engine 216 may reside on only a single computer or may span multiple computers such as, for example, a web interface for self-preparation. Tax preparation engine 216 may further communicate via a network with one or more sources of tax data items, such as payroll providers, banks, investment houses, etc. Tax preparation engine 216 may automatically generate tax forms for paper filing, or may communicate directly with a government taxation authority for electronic filing. Tax preparation engine 218 may be used by an individual tax preparer self-preparing a tax return, or by a tax professional preparing a tax return on behalf of a taxpayer. Tax preparation engine may also store prepared returns in data store 202 or 204 (as appropriate) for subsequent analysis by statistical analyzer 206 and comparator 212. In this way, new rules can be added to tax preparation engine 216 by rules generation engine 214 over the course of the tax season as new common mistakes are identified.

Figure 3:
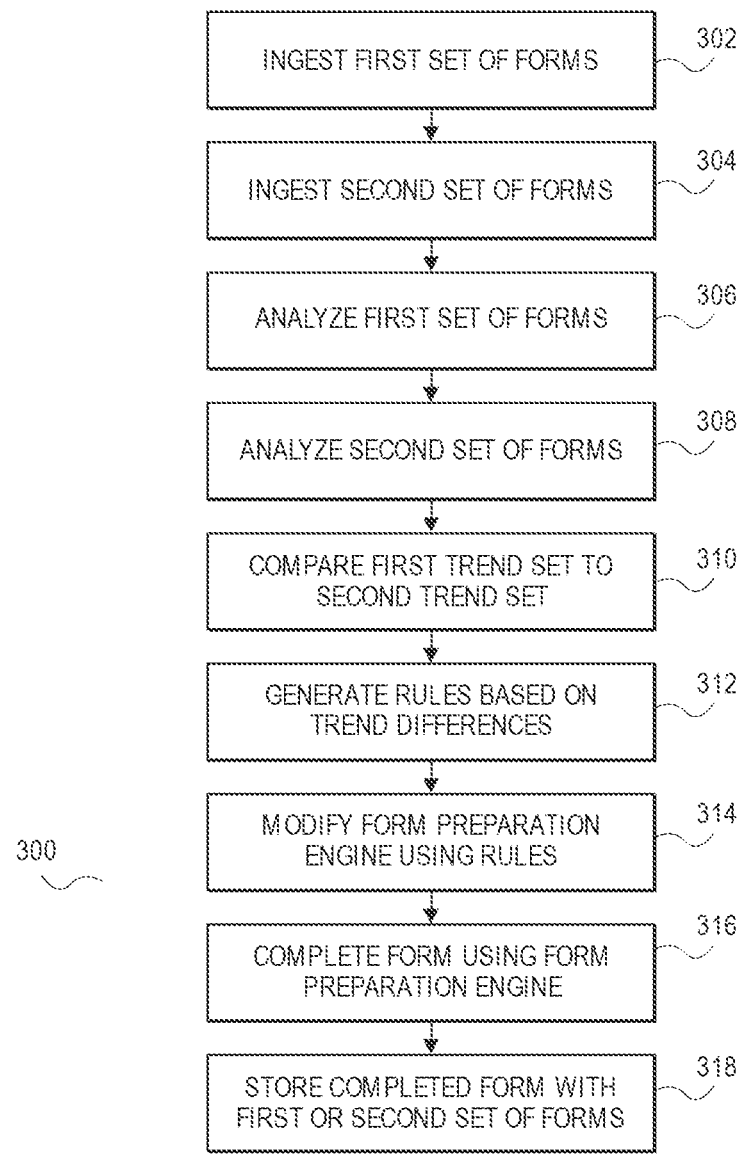
FIG. 3 depicts a flowchart illustrating the operation of a method in accordance with embodiments of the present invention.

Turning now to FIG. 3, a flowchart illustrating the operation of a method in accordance with embodiments of the invention is depicted and referred to generally by reference numeral 300. Initially, at a step 302, a first set of forms is ingested from a data store. As described above, the forms may be tax returns or any other form including a plurality of data items. Forms may be stored in an as-submitted format, in an attribute/value format, or in any other format. As a part of the ingestion process, the forms are converted to a standard representation usable by statistical analyzer 206.

Next, at a step 304, a second set of forms is ingested. As with the first set of forms, the second set of forms may be tax returns or any other types of forms. In some embodiments, the same set of data items (or potential data items) must be present in the second set of forms as in the first set of forms. In some embodiments, the second set of forms are ingested from a different data store than the first set of forms. In other embodiments, the second set of forms are ingested from the same data store as the first set of data forms, with the first set of forms divided from the second set of forms based on the value of one or more data items within the forms For example, if the forms are tax returns, then the first set of tax returns may be prepared by a tax professional, while the second set of tax returns may be self-prepared. Alternatively, the first set of tax returns may be prepared by employees of a return preparation company, while the second set of returns may be prepared by franchisees of the return preparation company. As described above, there more be more than two sets of forms. For example, forms may be divided among based on the certification level of the preparer, such as non-certified (self-prepared), basic tax professional, expert tax professional, and certified public accountant. As with the two-set case, forms may be stored jointly in a single data store prior to ingestion or stored in separate data stores.

Next, at a step 306, the first set of forms is analyzed to determine one or more trends within the data items making up the form. As discussed above, trends may be identified in a wide variety of ways. For example, pairwise correlations may be calculated across all data items in the form and trends identified for any pair with a correlation coefficient above a predetermined threshold. One of skill in the art will appreciate that multiple regression may be employed to similarly identify correlated triples or n-tuples.

Likewise, a wide variety of measures of correlation may be utilized to measure relationships between data items. For example, the Pearson correlation coefficient may be employed. Alternatively, nonparametric measures (such as, for example, the maximum information coefficient for continuous-valued data items) may be used to measure relationships between data items. In some embodiments, different trend metrics and/or threshold values may be employed for different data items. For example, correlations between pairs of binary values may be calculated using a first trend metric, correlations between pairs of continuous values may be calculated using a second trend metric, and correlations between binary values and continuous values may be calculated using a third trend metric. In some such embodiments, all such correlations may be normalized to fall within a particular range (for example, between −1 and 1).

Furthermore, trends may be represented in a variety of formats. For example, if thresholds are applied during the analysis process, trends may be simply represented as pairs (or tuples) of values. Alternatively, if pairwise correlations are calculated across all values, every pair might represent a trend with an associated strength (for example, the normalized correlation coefficient). One of skill in the art will appreciate that other, non-numeric trend metrics may have other representations for trends and any associated strength information.

Similarly, at step 308, the second set of forms is analyzed to determine one or more trends within the second data set. As described above, in some embodiments, the first set of forms and the second set of forms are required to have the same set of data items or potential data items associated with the respective sets of forms. As such, common data identifiers may be used across the first set of forms and the second set of forms such that trends common to the first set of forms and the second set of forms can be easily identified. This may also be the case, for example, if the first set of forms and the second set of forms are stored in a common data store and dynamically divided into the first set of forms and the second set of forms.

Next, at a step 310, the first trend set from the first set of forms and the second trend set from the second set of forms are compared to determine trend differences. Thus, for example, if a first data item is associated with a second data item in the first set of forms, but not in the second set of forms, a trend difference may be identified. Similarly, if the first data item is positively correlated with the second data item in the first data set but negatively correlated with the second data item in the second data set, a trend difference may also be identified.

In embodiments where standard or normalized correlations are provided for each pair of data items for each set, then trend differences may be identified by calculating an absolute difference for the respective correlations for each pair of data items and thresholding appropriately. In such embodiments, the first example above might correspond to correlations coefficients of 1 and 0 in the first and second set of forms respectively and the second example above might correspond to correlation coefficients of 0.5 and −0.5 in the first and second set of forms. The absolute correlation difference in both cases would be 1, so a trend difference would be identified for any threshold lower than that. One of skill in the art will appreciate that other trend metrics may have other methods for calculating trend differences. For example, if trends are represented by pairs of data items for each set of forms, then trend differences can be calculated by calculating the set difference between the intersection of pairs in both trend sets and the union of pairs in either trend set.

Processing then proceeds to a step 312, where the trend differences identified in step 310 are used to generate one or more rules for overriding the conventional operation of a form preparation engine. Broadly speaking, these rules guide the user so as to reduce the trend differences between the data set by reducing the incidence of errors. As such, given an identified difference in the two sets of forms, which set is more correct must be identified. In some embodiments, this information may be available a priori. For example, if the first data set contains tax returns prepared by tax professionals and the second data set contains self-prepared tax returns, it may be assumed that self-prepared returns should be guided to conform to the trend set of the professionally prepared returns.

In other embodiments, it must be determined which data set is more correct so that an appropriate rule can be constructed. For example, one data item included with a form may indicate whether the form was audited, amended, or otherwise externally indicated as being erroneous. If this data item is correlated with another data item in one set of forms, it may be an indication that that data set should be guided towards the other data set rather than vice versa. Alternatively, a set of forms which is more internally variable is less likely to be correct than one which is more internally consistent. Similarly, actual changes made during amendments may be included in the form such that changes in individual data items can be used to identify erroneous forms.

Next, at step 314, the rules generated at a step 312 are used to alter the operation of a form preparation engine. As described above, rules can alter the operation of the form preparation engine is a variety of fashions. For example, forms can be dynamically reflowed to add additional guidance, de-emphasize problematic form fields, add double checks or confirmations to problematic entries, suggest preferred options, present additional prompts, automatically populate certain form fields, autocorrect problematic entries, suggest "best" entries, and otherwise modify operation of the form preparation engine. One of skill in the art will further appreciate that the effects of rules will further depend on the precise operation of the form preparation engine.

Processing then proceeds to step 316, where a form is completed using the form completion engine. As discussed above, the form can be a tax return completed by a taxpayer self-preparing their tax return, or by a tax professional preparing their own tax return or by any other type of form preparation. The effect of rules may be different for these two scenarios. For example, if the two sets of forms correspond to self-prepared returns and professionally prepared returns, then the form engine may be altered for self-preparers to move their tax returns closer to the trend set of professionally prepared return for those trends where the professionally prepared tax returns are more correct. Similarly, the engine for tax professionals may be altered by rules to move it closer to the trend set of self-prepared returns for those trends where the self-prepared returns are more correct. One of skill in the art will readily appreciate how to apply rules in the case where more than two sets of forms are present.

Next processing continues at step 318, where the completed form (and any associated data items not directly included in the form) are stored in the appropriate data store. One of skill in the art will appreciate that, where all forms are stored in the same data store, the criterion used to divide the forms can also be stored with the form. Forms, once stored in the data store, may also be subsequently modified if, for example, the return is amended or audited. In some embodiments, the pre-amended as well as amended versions of the form are retained for use as described above. In some embodiments, flags are stored to indicate whether the return is audited and/or amended. In some embodiments, additional flags are stored to indicate one or more features of the form indicating additional information (e.g., that the forms was flagged as high-risk, that exceptional circumstances were present, etc.).

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of modifying an operation of a computer-implemented form completion engine, comprising:
   ingesting, from a first data store by a processor, a first set of forms corresponding to a plurality of previously submitted self-prepared tax returns;
   ingesting, from a second data store by the processor, a second set of forms corresponding to a plurality of previously submitted professionally prepared tax returns,
      wherein the second data store is separate from the first data store and the second set of forms are distinct from the first set of forms;
   analyzing, using a computer-implemented statistical analyzer, the first set of forms to determine a first trend set;
   analyzing, using the computer-implemented statistical analyzer, the second set of forms to determine a second trend set;
   comparing the first trend set and the second trend set to determine a trend difference indicative of a disparity between the plurality of previously submitted self-prepared tax returns and the plurality of previously submitted professionally prepared tax returns;
   based on the trend difference, generating, using a computer-implemented rules generation engine, a computer-generated rule for changing the operation of the computer-implemented form completion engine,
      wherein the operation of the computer-implemented form completion engine comprises assisting users in completing forms;
   modifying the operation of the computer-implemented form completion engine using the computer-generated rule to prevent users from making one or more errors while completing the forms via the computer-implemented form completion engine such that the trend difference is reduced;

completing the forms using the computer-implemented form completion engine, the computer-implemented form completion engine modified by the computer-generated rule;

storing completed forms in the first data store or the second data store, wherein storing the completed forms in the first data store or the second data store adds the completed forms to the first set of forms or the second set of forms such that the completed forms are subsequently analyzed by the computer-implemented statistical analyzer with the first set of forms or the second set of forms;

determining if the completed forms are subsequently audited; and storing audited versions of the completed forms in the first data store or the second data store to add the audited versions to the first set of forms or the second set of forms for subsequent analysis by the computer-implemented statistical analyzer, wherein storing the audited versions of the completed forms further comprises storing a flag with each of the audited versions to indicate the completed forms have been audited.

2. The method of claim 1, wherein the computer-implemented form completion engine, as modified by the computer-generated rule, assists the users of the computer-implemented form completion engine in completing tax returns consistent with the second trend set.

3. The method of claim 1,
wherein the audited versions of the completed forms are stored in the first data store such that the audited versions are added to the first set of forms,
wherein the first set of forms is a first set of tax returns that have been audited and the second set of forms is a second set of tax returns that have not been audited.

4. The method of claim 1, wherein the first trend set includes first correlations between first data items in the first set of forms and the second trend set includes second correlations between second data items in the second set of forms.

5. The method of claim 1, further comprising converting at least a portion of forms from at least one of the first set of forms and the second set of forms to a standard format,
wherein the standard format is usable by the computer-implemented statistical analyzer.

6. The method of claim 1, further comprising:
modifying a display interface of the computer-implemented form completion engine based on the computer-generated rule to prevent users from making the one or more errors when completing one or more subsequent forms during a tax interview session.

7. The method of claim 1,
wherein the previously submitted self-prepared tax returns comprise tax returns prepared using the computer-implemented form completion engine.

8. A self-learning system for completing forms, comprising:
a first data store storing a first set of forms corresponding to a plurality of previously submitted self-prepared tax returns;
a second data store storing a second set of forms corresponding to a plurality of previously submitted professionally prepared tax returns,
wherein the second data store is separate from the first data store and the second set of forms are distinct from the first set of forms;
a processor; and
a memory storing computer executable instructions that when executed by the processor cause the processor to perform:
analyzing, using a statistical technique, each of the first set of forms and the second set of forms;
generating a first trend set corresponding to the first set of forms and a second trend set corresponding to the second set of forms;
analyzing the first trend set and the second trend set to determine a trend difference;
generating a computer-generated rule based on the trend difference indicative of a disparity between the plurality of previously submitted self-prepared tax returns and the plurality of previously submitted professionally prepared tax returns;
allowing users to complete forms using a form completion engine,
wherein a behavior of the form completion engine is modified by the computer-generated rule to prevent the users from making one or more errors while completing the forms,
wherein the form completion engine is further programmed to store the forms in one of the first data store and the second data store once the forms are completed by the users,
wherein storage of completed forms in one of the first data store and the second data store adds the completed forms to one of the first set of forms and the second set of forms such that the completed forms are subsequently analyzed by the processor, using the statistical technique, with one of the first set of forms and the second set of forms;
determining if the completed forms are audited; and
storing audited versions of the completed forms in one of the first data store and the second data store to add the audited versions to one of the first set of forms and the second set of forms for subsequent analysis by the processor, using the statistical technique,
wherein storing the audited versions of the completed forms further comprises storing a flag with each of the audited versions to indicate the completed forms have been audited.

9. The self-learning system of claim 8,
wherein the audited versions of the completed forms are stored in the first data store such that the audited versions are added to the first set of forms,
wherein the first set of forms is a first set of tax returns that have been audited and the second set of forms is a second set of tax returns that have not been audited.

10. The self-learning system of claim 9, wherein the first trend set is generated by calculating pairwise correlations for a plurality of data items in the first set of forms.

11. The self-learning system of claim 8, further comprising a third data store storing a third set of forms.

12. The self-learning system of claim 8, wherein at least a portion of the forms from at least one of the first set of forms and the second set of forms are converted into a standard format,
wherein the standard format is usable by a computer-implemented statistical analyzer.

13. The self-learning system of claim 8,
wherein a display interface of the form completion engine is modified based on the computer-generated rule, wherein modifying the display interface comprises suppressing a common input field that is presented in the display interface by default and presenting an additional input field in the display interface that is hidden by default based on the computer-generated rule.

14. One or more non-transitory computer readable media storing computer-executable instructions that, when executed by a processor, perform a method of self-learning tax return completion, comprising:

ingesting a first set of tax returns from a data store corresponding to a plurality of previously submitted self-prepared tax returns;

ingesting a second set of tax returns from the data store corresponding to a plurality of previously submitted professionally prepared tax returns;

determining, using a computer-implemented statistical analyzer running on the processor, a first trend set for the first set of tax returns;

determining, using the computer-implemented statistical analyzer running on the processor, a second trend set for the second set of tax returns;

comparing the first trend set and the second trend set to determine one or more trend differences;

identifying at least one changed tax law based on at least one trend difference indicative of a disparity between the plurality of previously submitted self-prepared tax returns and the plurality of previously submitted professionally prepared tax returns from the one or more trend differences;

modifying an operation of a computer-implemented tax return preparation engine using a computer-generated rule based on the one or more trend differences to prevent users from making one or more errors when preparing tax returns by using the computer-implemented tax return preparation engine;

modifying a display interface of the computer-implemented tax return preparation engine based on the computer-generated rule to prevent the users from making the one or more errors within subsequent forms during tax interview sessions;

generating one or more tips associated with the at least one changed tax law to explain the at least one changed tax law;

preparing tax returns using the computer-implemented tax return preparation engine, the computer-implemented tax return preparation engine modified by the computer-generated rule;

storing prepared tax returns in the data store to add the prepared tax returns to the first set of tax returns or the second set of tax returns such that the prepared tax returns are comprised in the first set of tax returns or the second set of tax returns during subsequent statistical analysis by the computer-implemented statistical analyzer running on the processor;

determining if the prepared tax returns are subsequently audited; and storing audited versions of the prepared tax returns in the data store to add the audited versions to the first set of tax returns or the second set of tax returns for subsequent analysis by the computer-implemented statistical analyzer running on the processor, wherein storing the audited versions of the prepared tax returns further comprises storing a flag with each of the audited versions to indicate the prepared tax returns have been audited.

15. The one or more non-transitory computer readable media of claim 14, wherein the first set of tax returns have been audited and the second set of tax returns have not been audited.

16. The one or more non-transitory computer readable media of claim 14, wherein the computer-implemented tax return preparation engine is modified so as to guide the users preparing the tax returns towards the first trend set.

17. The one or more non-transitory computer readable media of claim 14, further comprising dividing a plurality of tax returns in the data store into the first set of tax returns and the second set of tax returns based on a data item in each of the plurality of tax returns, the plurality of tax returns including the prepared tax returns.

18. The one or more non-transitory computer readable media of claim 14, wherein the first trend set includes first pairs of data items correlated in the first set of tax returns and the second trend set includes second pairs of data items correlated in the second set of tax returns.

19. The one or more non-transitory computer readable media of claim 14, further comprising:

responsive to determining that the one or more errors is likely to occur, generating, during the tax interview sessions, one or more double-check prompts for display within the display interface of the computer-implemented tax return preparation engine to prevent the one or more errors.

20. The one or more non-transitory computer readable media of claim 14, wherein the previously submitted self-prepared tax returns comprise tax returns prepared using the computer-implemented tax return preparation engine.

\* \* \* \* \*